Patented Aug. 20, 1940

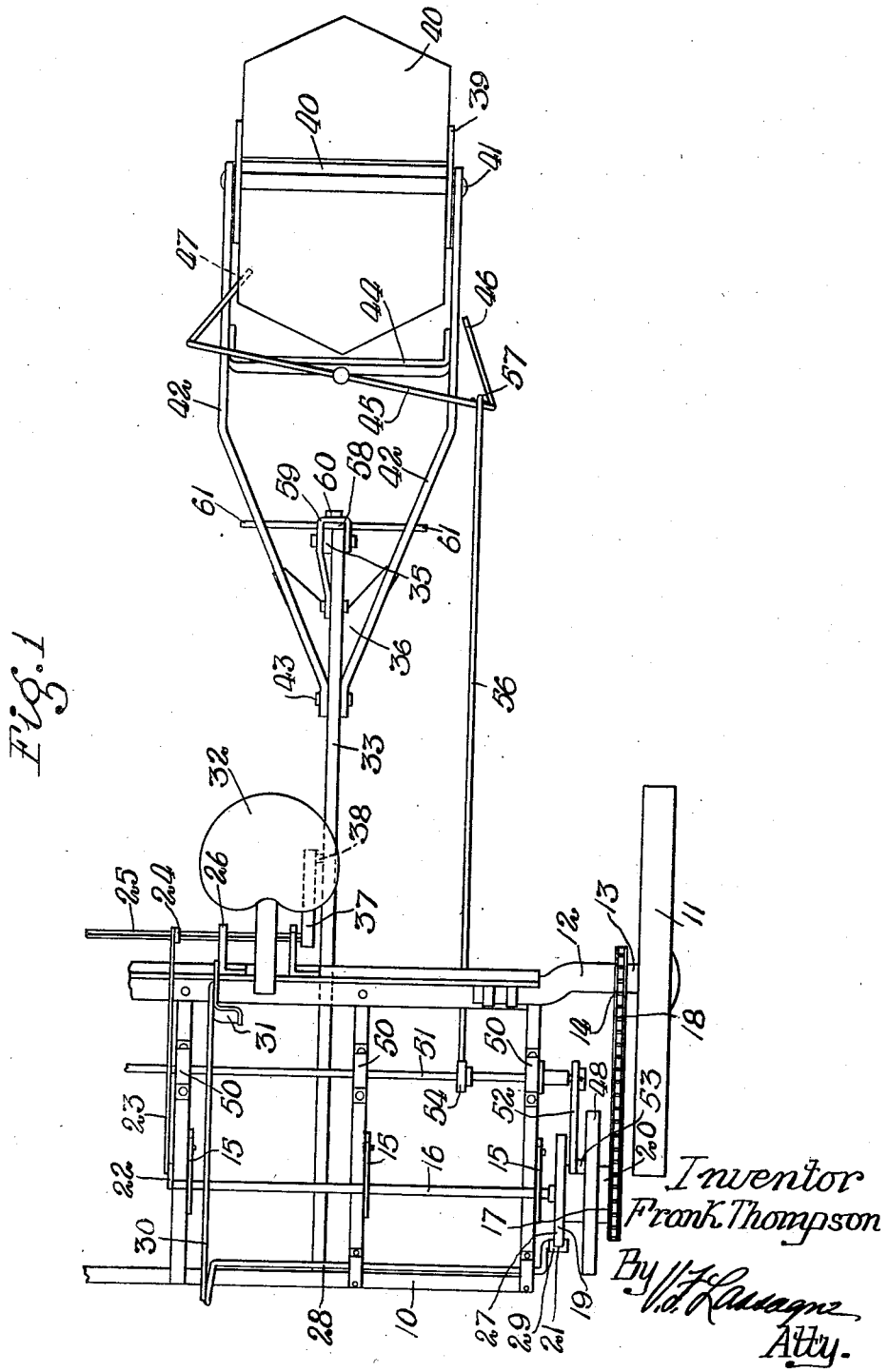

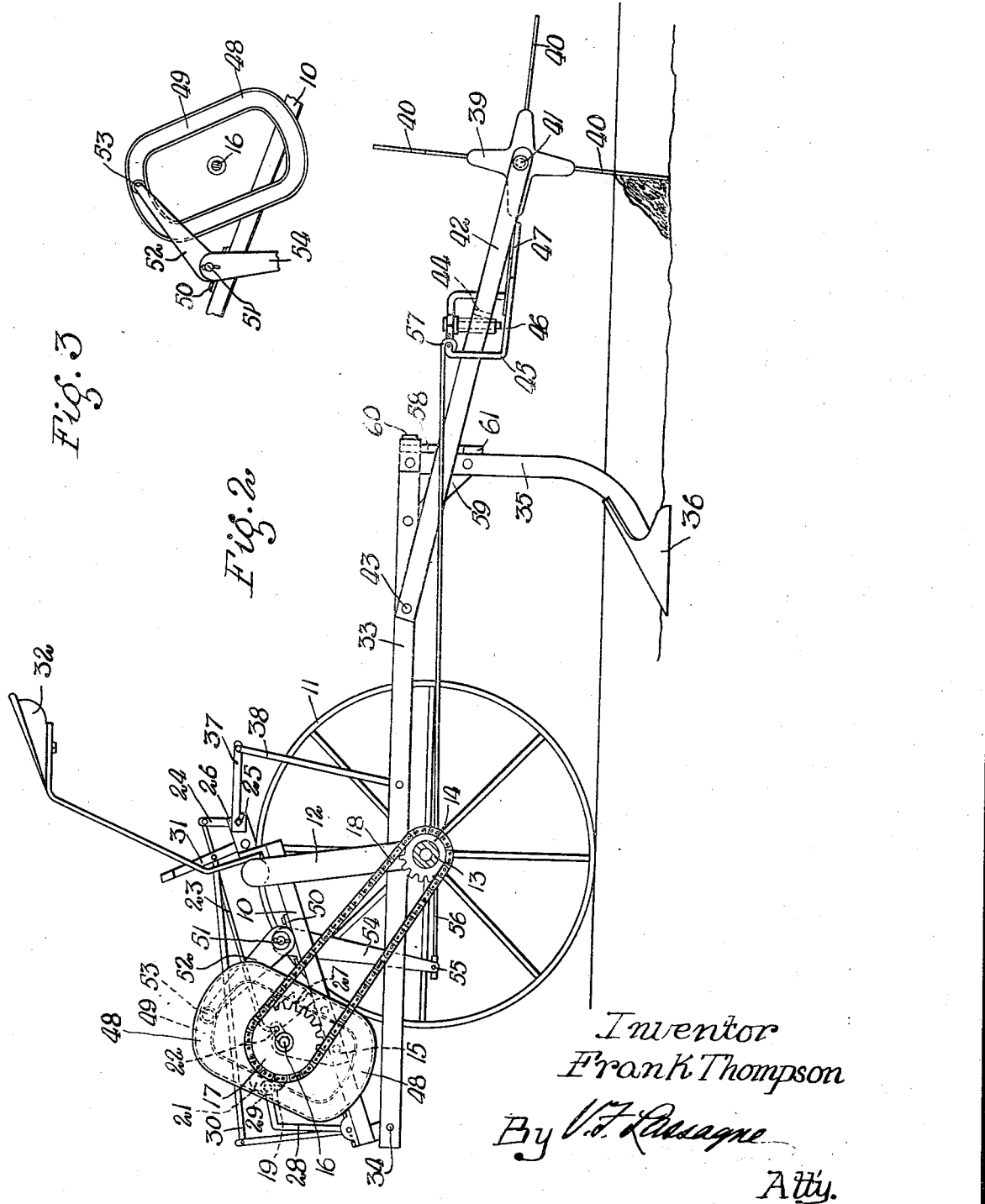

2,211,917

UNITED STATES PATENT OFFICE 2,211,917

BASIN FORMING DEVICE

Frank Thompson, Newtown, Geelong, Victoria, Australia, assignor to International Harvester Company, a corporation of New Jersey Application January 6, 1939, Serial No. 249,635

9 Claims. (Cl. 97—55)

This invention relates to an agricultural implement and more particularly to a basin forming attachment therefor.

As well known to those skilled in the art, implements of the basin forming type are widely used in areas where moisture is deficient and are used for preparing the soil to retain what moisture may be obtained when weather conditions permit. The principal function of such a device is to form water collecting dams or basins in the soil in connection with furrows formed by a furrow forming tool carried by an implement which serves also to carry the basin forming tool.

The principal object of the present invention is to provide an improved basin forming tool which is adapted to be readily attached to a conventional agricultural implement.

An important object is to provide a basin forming tool which is adapted to be actuated by power driven means provided on the implement.

Another object, specifically, is to provide means for actuating the basin forming tool from power lift means provided on the implement.

And another object is to provide the basin forming tool in the form of a rotatable element having a plurality of ground engaging blades, which blades are successively and alternately released and engaged by actuating means, thus permitting formation of dams or basins at spaced points in the soil.

Briefly and specifically these and other desirable objects are achieved by the provision of a rotatable basin forming element arranged to operate rearwardly of a furrow forming tool or cultivator shovel, such as is ordinarily provided on a conventional agricultural implement of the cultivator type. In a preferred construction, the cultivator is provided with power lift means for raising and lowering the cultivator shovel and beam, and this means includes a constantly rotating part, which is operatively interconnected with the rotatable basin forming element. The rotatable element is provided with a plurality of ground engaging blades, which are alternately and successively released and engaged by means driven by the power lift, said means alternately moving into and out of the path of rotation of the blades, whereby one blade is released and another blade is engaged.

A more complete understanding of the aforementioned and other objects may be had from the following description taken in conjunction with the accompanying sheets of drawings, in which:

Figure 1 is a plan elevational view of one side of an agricultural implement, showing the improved basin forming tool attached thereto;

Figure 2 is a side elevational view of the same; and,

Figure 3 is a side elevational view of a portion of the means utilized to actuate the basin forming tool.

In the present disclosure an agricultural implement of the cultivator type has been chosen for the purpose of illustration. This cultivator 10 comprises generally a cultivator frame 10 carried by a pair of laterally spaced ground wheels 11. The wheels 11 support the frame 10 through the medium of crank axles 12, a lower spindle portion 13 of one axle carrying rotatably thereon a drive sprocket 14. The sprocket 14 is preferably included as a portion of the inner hub part of a wheel 11 and is mounted for rotation therewith. The frame 10 is provided with a plurality of supporting brackets 15, which serve to journal a transverse shaft 16. The shaft 16 carries rotatably thereon a sprocket 17, which is driven by a chain 18 from the drive sprocket 14. The shaft also carries a power lift means or mechanism 19, which is generally of conventional construction, including a constantly rotating part 20, mounted for rotation with the sprocket 17, and an intermittently rotating part 21, mounted for rotation with the shaft 16. This mechanism is mounted at one side of the cultivator frame 10, and the inner end of the shaft 16 is provided with a crank arm portion 22, which is connected by a rearwardly extending link 23 to an arm 24, rigidly carried by a transverse lifting shaft 25 mounted in suitable brackets 26 at the rear portion of the frame 10.

The power lift is of the half-revolution type, in which the intermittently rotating member 21 is provided with a pair of diametrically opposed notches 27. A throw-out member 28 includes a roller 29, which is adapted to be moved into and out of engagement with the notches 27 to actuate the power lift, all of which is well known to those skilled in the art. The control member 28 is actuated through the medium of a rearwardly extending link 30 operatively connected to a foot lever 31 movably mounted on a rear portion of the frame 10. An operator's station 32 is suitably carried by the frame 10, and the foot lever 31 is within easy reach thereof.

A furrow forming tool is carried by the frame 10 and cmprises generally a rearwardly extending beam 33, which is carried for vertical movement about a horizontal axis on a transverse pivot 34 located at the front end of the frame 10. The beam 33 extends a considerable distance rearwardly of the frame 10 and is provided with a standard 35, at the lower end of which is carried a cultivator shovel or the like 36. An arm 37 is rigidly carried by the lifting shaft 26 and is suitably connected by a link 38 to an intermediate portion of the beam 33. When the cultivator is in motion, the sprocket 17 and the constantly rotating part 20 of the power lift 19 are driven, and, when the foot lever 31 is moved forwardly, the control member 28 also moves forwardly, thus moving the roller 29 out of engagement with the notch 27 in the intermittently rotating part 21, thus permitting the intermittently rotating part to be driven by the constantly rotating part 20 for raising the beam 33. When the beam 33 is raised to its highest position, the roller 29 engages the other notch 27 and maintains the beam and shovel in lifted position. Further forward movement of the control member 38 permits operation of the intermittently rotating part 21 to lower the beam and shovel to operating position.

A basin forming tool is arranged behind the implement and is adapted to operate in the furrow formed by the furrow forming tool or shovel 36. The basin forming tool comprises a rotatable element 39 having a plurality of radially extending ground engaging blades 40. This element is rotatably carried on a transverse shaft 41 supported by and between a pair of longitudinally extending supports or bars 42. The bars 42 extend forwardly and converge to a point 43 where they are pivotally carried by the beam 33. A transverse support or brace member 44 is rigidly secured between the bars 42 forwardly of the circular path of rotation of the blades 40. This member serves to reenforce the bars 42 and also serves to carry pivotally thereon an oscillatable member 45. This member 45 is provided with opposite end portions 46 and 47, both of which are bent inwardly and rearwardly toward the center of the rotatable element 39. As best shown in Figure 1, the portion 47 on the member 45 is disposed in the path of rotation of the blades 40 and the portion 46 is at a position out of said path of rotation. The member 45 provides means which may be oscillated, as will hereinafter more fully appear, into and out of the path of rotation of the element 39 for alternately releasing and engaging successive blades 40.

As previously mentioned, the sprocket 17 and the power lift part 20 are constantly driven from the sprocket 14 on the wheel 11. The constantly rotating part 20 carries rigidly thereon for rotation therewith means, in the form of a cam 48, for oscillating the member 45. This cam 48 is provided with a cam track 49, which is substantially rectangular in shape, having opposed rounded ends formed about the axis of the shaft 16 as a center. The frame 10 carries a plurality of laterally spaced brackets 50, which serve to journal a transverse shaft 51, on the outer end of which is keyed or otherwise rigidly carried an arm 52, which extends forwardly and upwardly, being provided thereat with a roller 53 fitting in and engaging the cam track 49 in the cam 48. A second arm 54 is rigidly carried by and keyed to the shaft 51 and extends downwardly therefrom, being pivotally connected at its lower end, as at 55, to a rearwardly extending link 56, which at its rear end is connected at 57 to one side of the oscillatable member 45. A lifting member 58 is rigidly carried at a rear portion of the beam 33 and is rigidly secured thereto through the medium of a bracket 59 and a bolt 60. This member extends downwardly and transversely at both sides of the standard 35 and has opposite outer portions 61 projecting below the spaced bars or members 42 of the basin forming tool. This member provides means for engaging the members 42 when the cultivator beam 33 is raised for the purpose of raising the basin forming tool along with the furrow forming tool when the power lift 19 is operated.

As the cultivator is operated over the field with the cultivator shovel in lowered position, furrows are formed thereby. The basin forming tool at the rear of the implement is held against rotation by the engagement between the member 45 and one of the blades 40. Because of the shape of the cam track 49 in the cam 48, this position of the basin forming tool is held for a predetermined period. In the present position of the parts as illustrated in the drawings, the end portion 47 of the member 45 is engaging one of the blades 40 of the rotatable element 39. In this stationary position, the basin forming tool is adapted to scrape the furrow and accumulate a heap of soil before it. Since the cam 48 is being constantly driven through the medium of the sprocket 17 and chain 18, the roller 53 on the arm 42 follows the cam track 49, which, at the straight side of the cam, is closer to the axis of the shaft 16, thus moving the arm 52 downwardly and the arm 54 rearwardly. This movement oscillates the member 45 and moves the portion 47 thereon out of the path of rotation of the blades 40, permitting the element 39 to rotate and "step over" the accumulated heap of soil. When the portion 47 of the member 45 moves out of engagement with a blade 40, the portion 46 moves into engagement with a successive blade and thus engages the rotatable element to hold the same against rotation until another heap of soil is accumulated in the furrow, at which point the roller 53 on the arm 52 follows the cam track 49 into a curved end portion, thus moving the arm 52 upwardly and the arm 54 forwardly. Continued forward movement of the implement over the field results in continued rotation of the cam 48, which, in turn, causes operation of the parts to move opposite portions 46 and 47 of the member 45 alternately into and out of the path of rotation of the blades for alternately releasing one blade and engaging another or successive blade. By this provision, rotation of the basin forming tool is interrupted at predetermined intervals to form dams or basins in the soil at predetermined spaced points.

It will be noted from the drawings and the foregoing description that only one unit comprising a furrow forming tool and basin forming tool has been described. It will be understood, of course, that only one side of the implement is shown for the sake of simplifying the disclosure, and it will be appreciated that a plurality of cultivator beams and shovels may be arranged in laterally spaced relation on the cultivator frame as shown. Other similar basin forming tools may be similarly attached to and arranged behind each beam 33. The furrow forming tools and basin forming tools may be individually operated by separate mechanisms or may be collectively operated by the same mechanism through the medium of transverse extensions of the shafts 16, 26 and 51.

It will be appreciated that numerous other alterations and modifications may be made in the construction of the device as shown without departing from the spirit and scope of the appended claims.

What is claimed is:

1. In combination with an agricultural implement having a furrow forming tool and power lift means for raising and lowering said tool, a basin forming tool arranged rearwardly of the furrow forming tool and comprising a rotatable element having a plurality of ground engaging blades, and means actuated by the power lift means and associated with the rotatable element for interrupting rotation of said element at intervals.

2. In combination with an agricultural implement having a furrow forming tool and power lift means for raising and lowering said tool, said means including a rotating part, a basin forming tool arranged rearwardly of the furrow forming tool and comprising a rotatable element having a plurality of ground engaging blades, and means actuated by the rotating power lift part and associated with the rotatable element for interrupting rotation of said element at intervals.

3. In combination with a wheeled frame having a member driven by a wheel, a basin forming tool carried by the frame and comprising a rotatable element having a plurality of ground engaging blades, means movably associated with the frame and including a pair of portions adapted to be alternately moved into the path of rotation of said blades, and means operatively interconnected between the movable means and the member for actuating the movable means at intervals for moving one of the portions out of the path of one blade and the other portion into the path of another blade.

4. In combination with an agricultural implement having a furrow forming tool and power lift means for raising and lowering said tool, a basin forming tool arranged rearwardly of the furrow forming tool and comprising a rotatable element having a plurality of ground engaging blades, and means actuated by the power lift means and associated with the rotatable element, said means including a pair of portions adapted to be moved alternately into and out of the path of rotation of the blades for alternately releasing one blade and engaging another blade.

5. In combination with an agricultural implement having a furrow forming tool and power lift means for raising and lowering said tool, said means including a rotating part, a basin forming tool arranged rearwardly of the furrow forming tool and comprising a rotatable element having a plurality of ground engaging blades, and means actuated by the power lift part and associated with the rotatable element, said means including a pair of portions adapted to be moved alternately into and out of the path of rotation of the blades for alternately releasing one blade and engaging another blade.

6. In combination with an agricultural implement having a furrow forming tool and power lift means for raising and lowering said tool, a basin forming tool arranged rearwardly of the furrow forming tool and comprising a rotatable element having a plurality of ground engaging blades, means actuated by the power lift means and associated with the rotatable element for interrupting rotation of said element at intervals, and means interconnecting the furrow forming tool and the basin forming tool for raising the latter with the former when the power lift means is actuated.

7. In combination with an agricultural implement having a furrow forming tool and power lift means for raising and lowering said tool, said means including a rotating part, a basin forming tool arranged rearwardly of the furrow forming tool and comprising a rotatable element having a plurality of ground engaging blades, means actuated by the power lift part and associated with the rotatable element, said means including a portion adapted to be moved alternately into and out of the path of rotation of the blades for alternately releasing one blade and engaging another blade, and means interconnecting the furrow forming tool and the basin forming tool for raising the latter with the former when the power lift means is actuated.

8. In combination with an agricultural implement having a furrow forming tool and power lift means therefor, said means including a constantly rotating part, a basin forming tool arranged rearwardly of the furrow forming tool and comprising a rotatable element having a plurality of ground engaging blades, a pivoted member carried by the implement and having a portion adapted to be moved alternately into and out of the path of rotation of the blades, and means driven by the power lift constantly rotating part and operatively connected to the pivoted member for actuating said member to move the portion thereon out of the path of one blade and into the path of another blade.

9. In combination with an agricultural implement comprising a wheeled frame having a beam carrying a furrow forming tool, and power lift means raising and lowering said tool, a pair of spaced bars connected to the beam and extending rearwardly thereof, a basin forming element rotatably carried between said bar and having a plurality of ground engaging blades, a transverse support carried by the bars, an oscillatable member carried by the support and having a pair of portions adapted to be moved alternately into and out of the path of rotation of the basin forming element to release and engage successive blades at intervals, and means interconnecting the power lift means and the member for oscillating said member.

FRANK THOMPSON.